Patented Mar. 4, 1952

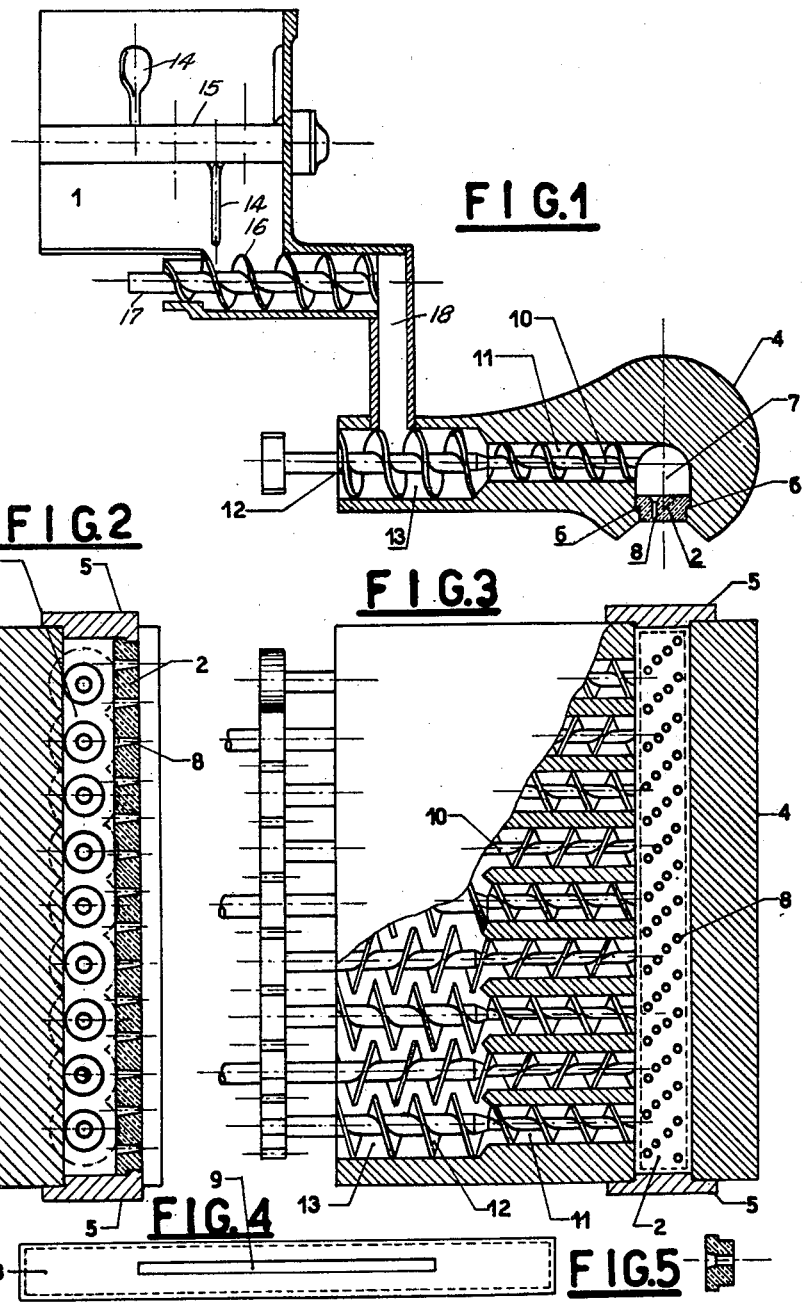

2,588,196

UNITED STATES PATENT OFFICE 2,588,196

PRESS FOR MACARONI

Luigi Barbieri, Parma, Italy

Application December 14, 1946, Serial No. 716,399
In Italy June 12, 1943

Section 1, Public Law 690, August 8, 1946
Patent expires June 12, 1963

1 Claim. (Cl. 107—14)

This invention relates to improvements in presses for manufacturing macaroni.

Presses for alimentary pastes, where the die has a rectangular shape and is provided with a number of holes, or with a long and narrow slit for producing a flat dough, are already known.

In these presses the problem of feeding the dough with a uniform pressure along the whole surface of the die is of the utmost importance. This problem is usually solved either by using special methods for distributing the pressed dough, or by means of multiple screws; in the latter case, however, the problem of uniform feeding still exists, since these pressing screws must be uniformly fed.

The object of the present invention is to provide a press of the specified type, wherein the multiple screws that perform the pressing operation are connected and coaxial with larger diameter screws whose task is that of attaining a self-distribution of the dough in addition to kneading and feeding the same to the pressing screws. In the device forming this invention each one of the above mentioned screws turns in the opposite direction with respect to the adjoining screw and the arrangement is such that the worms of the kneading screws penetrate into each other, while the pressing screws are enclosed in suitable stationary cylinder-shaped cavities machined in the press head.

Furthermore, the press head which includes these cavities is separable from the kneading or back part of the press, so as to facilitate inspecting and cleaning of the screws.

The press in conformity with the invention, owing to the pressure uniformity which it provides, can be used with great advantage with a die having one longitudinal slit only for directly producing flat dough.

The drawing attached heerto shows an exemplary form of the press in conformity with the invention, wherein:

Fig. 1 is a vertical cross-section thereof;

Fig. 2 is a horizontal cross-section thereof;

Fig. 3 is a bottom plan view of the press partly broken away to expose the feed screws and the chambers wherein they are mounted;

Fig. 4 is a plan view of a modified form of die for flat dough;

Fig. 5 is a cross-section of the modification shown in Fig. 4.

Referring to the drawings, Fig. 1 shows the kneading-pressing machine in cross section, as a whole. Drawing of the dough takes place by means of a rectangular die 2 (or 3), instead of using the common round dies. These dies 2 or 3 are mounted in one side of the press front head 4, by removing the end covers 5, which are attached to the above mentioned head 4 by means of clamps (not shown), and by causing the dies to slide on their longitudinal flanges 6 having a dented or otherwise shaped outline, such flanges riding on corresponding inner shoulders of the head 4, underneath the closed pressure chamber 7. The die 2 is used for paste that must be stretched out on rods and has drawing holes 8 arranged in a series of parallel inclined lines with respect to the longitudinal axis of the die as shown in Fig. 3, in such fashion as to form a uniform and continuous series of holes along the die. After drawing, the paste is collected, underneath, by the stretch-out rod (not shown), as the paste moves along and forms upon said rod a single thread or ribbon. The die 3 is used for flat dough and has a single rectangular opening 9, arranged lengthwise, out of which a ribbon of uniform thickness is drawn, which is subsequently thinned out by the rolling cylinders (also not shown).

In order that these objects may be obtained, the dough must reach the die under a uniform pressure along its whole length.

This is obtained by means of a uniform pressure on the dough determined by several endless screw propellers 10, arranged inside cylindrical chambers 11, which are fed by the dough coming from the kneading part 1, of the machine, through larger diameter screws 12, arranged on the extension of the propeller shafts 10 and intermeshing with each other inside a single chamber 13.

The dough fed into the larger screws 12, is pushed forward by the rotary movement of those screws (propelled by outside gears or any other suitable driving devices), such screws intermeshing with each other and rotating in opposite directions each with respect to an adjoining screw, so that the dough is uniformly distributed among all the screws. The propelling screws 10 are therefore each fed with the same quantity of the dough and develop a uniform pressure on the dough, which, being thus pressed, is conveyed in the pressure chamber 7 above the rectangular die, to issue underneath in the shape of uniform threads or ribbons.

The head 4 is preferably separable from the back part of the press so as to be easily pulled away from the screws, which are thus easily accessible. The kneading vessel 1 is provided with rotary kneading paddles 14 mounted on shaft 15, the dough passing through opening 16 onto screw conveyor 17 and by pressure exerted by screw 17 along passage 18 onto conveyor 12.

Having now particularly described and ascertained the nature of my said invention and in what manner the same is to be performed, I declare that what I claim is:

An extruding screw press for pasty material comprising a chamber of elongated cross-section, a plurality of cylindrical chambers communicating with one end of said chamber, a pressing screw working in each of said cylindrical chambers and provided with a portion of enlarged outer diameter extending into said first mentioned chamber, the coils of said enlarged portions intermeshing with each other, said first mentioned chamber completely and closely surrounding said screws except for a minor part thereof which is provided with a feeding aperture, shafts integral with said screws and extending outside said first mentioned chamber and provided with intermeshing gear wheels, an elongated collecting chamber communicating with said cylindrical chambers at the opposite end thereof with respect to said first mentioned chamber, and an elongated die plate closing said collecting chamber.

LUIGI BARBIERI.

REFERENCES CITED

The following references are of record in the file of this patent:

UNITED STATES PATENTS

| Number | Name | Date |
|---|---|---|
| 155,602 | Weigand | Oct. 6, 1874 |
| 249,938 | Holmes | Nov. 22, 1881 |
| 498,206 | Denbeigh | May 23, 1893 |
| 803,017 | Palmer | Oct. 31, 1905 |
| 918,195 | Pooley | Apr. 13, 1909 |
| 1,701,850 | Holtzman | Feb. 12, 1929 |
| 2,099,119 | King et al. | Nov. 16, 1937 |
| 2,119,162 | Hartner | May 31, 1938 |

FOREIGN PATENTS

| Number | Country | Date |
|---|---|---|
| 20,426 | Great Britain | Oct. 1 1914 |